United States Patent [19]

McConnaughay

[11] 3,713,856
[45] Jan. 30, 1973

[54] PAVING COMPOSITION AND METHOD OF MAKING IT

[76] Inventor: Kenneth E. McConnaughay, P.O. Box 1457, Lafayette, Ind. 47902

[22] Filed: Jan. 27, 1972

[21] Appl. No.: 221,441

Related U.S. Application Data

[63] Continuation-in-part of Ser. No. 48,513, June 22, 1970, abandoned.

[52] U.S. Cl. ................................ 106/96, 106/97
[51] Int. Cl. ................................ C04b 7/02
[58] Field of Search....106/90, 96, 99, 277, 280, 281, 106/273

[56] References Cited

UNITED STATES PATENTS

| | | | |
|---|---|---|---|
| 3,208,863 | 9/1965 | Eick et al. | 106/96 |
| 2,861,004 | 11/1958 | Sucetti | 106/277 |
| 2,773,777 | 12/1956 | Alexander et al. | 106/96 |
| 3,423,222 | 1/1969 | McConnaughay | 106/96 |

Primary Examiner—James E. Poer
Attorney—Thomas P. Jenkins et al.

[57] ABSTRACT

A paving composition and method of making it in which an aggregate is mixed with a bituminous material to coat the aggregate particles with a bituminous film. After coating, the aggregate is mixed with Portland cement and water and the resulting paving composition is spread on the surface to be paved.

8 Claims, No Drawings

PAVING COMPOSITION AND METHOD OF MAKING IT

This application is a continuation-in-part of my copending application, Ser. No. 48,513, filed June 22, 1970, now abandoned.

BACKGROUND OF THE INVENTION

Pavements made with Portland cement and aggregate have excellent load supporting characteristics. They have a high modulus of elasticity and are therefore relatively brittle causing them to be affected by stresses and strains induced by loading, changes in temperature and/or moisture, and the like. Consequently, they are subject to cracking and rupture due to the combined effects of restrained warping and stresses.

To help alleviate these problems, expansion and contraction joints are formed in such pavements. Such joints, as in the case of highways, extend transversely of the highway every 12 to 30 feet. In addition, longitudinally extending joints are frequently employed. The joints in such pavements are, according to conventional practices, performed with a compressible joint material, or sawed and then filled with a sealing material, or the like. None of these methods of forming expansion and contraction joints, however, overcomes the detrimental effects of cracking and distortion. Further, such joints create undesirable discontinuities in the surface of the pavement which manifest themselves, as to the traffic moving thereon, as bumps.

My invention overcomes these problems by the provision of a paving composition made with Portland cement in which the aggregate with which the cement is mixed is pretreated to lower the modulus of elasticity of the resulting paving composition and alter its expansion and contraction characteristics to thereby reduce the number of, or completely eliminate, expansion and contraction joints employed in a pavement made with a Portland cement paving composition.

SUMMARY OF THE INVENTION

In accordance with the preferred form of the invention, a mixture of coarse and fine aggregate is mixed with a bituminous emulsion to form a film of the bitumen over the particles of aggregate. The emulsion and aggregate are proportioned together to provide a coated aggregate containing 5 percent of the bitumen. The coated aggregate is then mixed with 18 percent Portland cement, based on the weight of the coated aggregate, and 8 percent water, based on the weight of the coated aggregate and cement mixture. After mixing, the paving composition is spread over the surface to be paved and allowed to cure.

DETAILED DESCRIPTION OF THE PREFERRED EMBODIMENT

Pavements made with Portland cement have a high modulus of elasticity and a low coefficient of expansion. This results in such pavements being brittle so that they can not stretch and give when subjected to forces imposed by such factors as loading, changes in temperature and/or moisture and the like. As a consequence thereof such pavements are provided with expansion and contraction joints. In highway construction these joints extend longitudinally of the highway and transverse joints are provided every 12 to 30 feet.

Pavements made with bitumen binders, however, are more plastic in nature. They easily stretch and give under the forces imposed by loading, changes in temperature and/or moisture, and the like. Consequently, there is no necessity of providing expansion or contraction joints in the pavements using bituminous binders.

I have found that by coating the aggregate with a film of bituminous material and then mixing that coated aggregate with Portland cement and water in a conventional manner and in conventional proportions I can produce a pavement which will have the desired strength characteristics but which will have the ability to distribute length and volume changes in a continuous way so that such changes are accommodated without cracking or with a minimum of cracking. This also permits the construction of a pavement employing Portland cement without the necessity of providing expansion or contraction joints in such pavement or at least reducing the number of such joints.

The bituminous material used for coating the aggregate can be tar, asphalt, cut-back asphalt, and the like or fast or medium breaking asphaltic emulsions capable of passing the ASTM D-244 coating ability and water resistance test. It is essential that said bituminous material be capable of forming a film around the aggregate particles as contrasted to merely being dispersed throughout them. Thus, if an asphaltic emulsion is employed, it cannot be a slow setting emulsion which merely forms dispersion throughout the aggregate instead of a film on the individual aggregate particles. If the aggregate is to be coated with a hot bitumen, that is one whose temperature is above 212° F, the bitumen selected should have an absolute viscosity at 140° F. of from 200 poises to 60,000 poises. The aggregate can be the same aggregate conventionally employed in cement construction; that is, coarse aggregate sized from a 2 inch sieve to a 0.5 inch sieve, a fine aggregate sized from a No. 4 sieve to a No. 200 sieve, and mixtures thereof.

Because of the difference in particle size between coarse and fine aggregates, when the coarse aggregates alone are coated, they are coated with from about 2 percent to about 4.5 percent of the bituminous material; when the fine aggregates alone are coated, they are coated with from about 3 percent to about 8 percent of the bituminous material; when mixtures of said coarse and fine aggregates are coated, they are coated with from about 3 percent to about 6 percent of the bituminous material. The amount of bituminous material mixed with the aggregate and the size or sizes of the aggregate coated is chosen to provide the desired volume change effects in the finished pavement while still retaining the desired compression and flexural strength in the pavement. However, I have found that if the bituminous material is added to the aggregate at a rate of from 2 percent to 8 percent, based on the weight of the aggregate, the resulting paving composition using Portland cement as a binder is adaptable for most paving applications. If a lesser amount of bituminous material is employed, the coating on the aggregate in not sufficient to allow for expansion and contraction of the resulting pavement. Conversely, if too great amount of bituminous material is employed, some of the coating comes off into the cement matrix and prevents the cement from properly setting.

The coated aggregate can be mixed with the Portland cement immediately after coating. Alternatively, the coated aggregate can be stockpiled for later mixing with the Portland cement. When such stockpiling is to be employed, a bituminous material having a viscosity in the range of from 20 cSt. (centistokes) to 6,000 cSt. at 140° F. is employed to prevent the aggregate in the stockpile from being bound and clumped together by the coating thereon.

In order to make the film on the aggregate tougher and with more flexibility, fibrous materials such as asbestos, glass fibers, nylon fibers, mica, and the like may be added to the bituminous material. When such fibers are employed, they are added to the bituminous material at a rate up to about 3 percent based on the weight of the bitumen. Fillers such as slate flour, powered rubber, clay, fly ash, ground limestone, and the like may also be added to the bituminous material either alone or in combination with the fibers. When such fillers are employed, they are added to the bituminous material at the rate of up to about 18 percent based on the weight of the bitumen.

The following examples illustrate various paving compositions that have been prepared according to the invention.

EXAMPLE 1

A gravel aggregate mixture consisting of 60 percent coarse aggregate and 40 percent fine aggregate was mixed with an asphaltic emulsion at 70° F. for one minute in a mixer. The emulsion, which consisted of 60 percent of a 150 penetration asphalt, 1.8 percent crude tall oil, 0.25 percent caustic soda, and 37.95 percent water, was mixed with the aggregate at a rate such that the coated aggregate contained 5 percent asphalt. The asphalt coated aggregate was removed from the mixer and immediately mixed at 70° F. with 15 percent Portland cement and 8 percent water.

EXAMPLE 2

A limestone coarse aggregate was mixed at 260° F. with a 200 penetration asphalt which had been heated to 300° F. The asphalt contained 2 percent of asbestos fibers. The coated aggregate, which contained 3.5 percent asphalt, was removed from the mixer, and after it had cooled to 200° F., it was mixed with a mixture consisting of 35 percent sand, 16 percent Portland cement and 9 percent water, which was at a temperature of 100° F.

EXAMPLE 3

An aggregate mixture consisting of 65 percent coarse aggregate and 35 percent fine aggregate was mixed at 70° F. with a paving tar Grade 2 for one minute in a mixer. The coated aggregate, which contained 4 percent tar, was removed from the mixer and placed in a stockpile. After 30 days, the coated aggregate was removed from the stockpile and mixed at 70° F. with 16% Portland cement and 9 percent water.

EXAMPLE 4

A gravel aggregate mixture consisting of 60 percent coarse aggregate and 40 percent fine aggregate was separated into its coarse and fine particles. The coarse particles were mixed in a mixer at 200° F. with an ASTM RC-800 cut-back asphalt consisting of naptha and an 85-100 penetration asphalt. The cut-back asphalt was added to the aggregate at a rate such that the coated aggregate contained 4 percent asphalt. After such coating a ground limestone filler whose particles passed a 200 mesh sieve was added to the mixer followed by the fine aggregate particles, said filler being added at the rate of 7 percent based upon the weight of the asphalt. When this mixture had thoroughly mixed together, it was removed to another mixer and immediately mixed with 12% Portland cement and 8 percent water.

The bitumen coated aggregate can also be mixed with Portland cement to form a compacted pavement. When such compositions are prepared, the aggregate is coated with from about 2 percent to about 4 percent of the bitumen and then mixed with from about 2 percent to about 7 percent Portland cement and from about 3 percent to about 6 % water.

In order to evaluate the changes in the expansion and contraction characteristics of a paving composition in which the aggregate is coated with a bituminous binder before being mixed with Portland cement, a series of samples 4 inches by 4 inches by 30 inches were prepared and changes in their lengths were measured when their temperatures were lowered from 140° F. to −10° F. The results of such tests are shown in table I.

TABLE I

| Sample No. | Composition | Change in Length (inches) |
|---|---|---|
| 1 | A 60–40 mixture of coarse and fine aggregate, respectively, mixed with 6% bitumen and 0% Portland cement. | 0.207 |
| 2 | A 60–40 mixture of coarse and fine aggregate, respectively, in which only the coarse aggregate was coated with 3% bitumen and the entire mixture was mixed with 16.2% Portland cement. | 0.049 |
| 3 | A 60–40 mixture of coarse and fine aggregate, respectively, in which only the fine aggregate was coated with 3% bitumen and the entire mixture was mixed with 16.8% Portland cement. | 0.051 |
| 4 | A 60–40 mixture of coarse and fine aggregate, respectively, was coated with 3% bitumen and mixed with 15% Portland cement. | 0.041 |
| 5 | A 60–40 mixture of uncoated coarse and fine aggregate, respectively, was mixed with 18% Portland cement. | 0.030 |

In each of samples 1–4 in Table I the bitumen was asphalt which had been emulsified. The emulsion consisted of 70 percent of an 85–100 penetration asphalt, 1.5 percent crude tall oil, 0.2 percent caustic soda and 28.3 percent water. The emulsion at 70° F. was mixed with the aggregate for one minute in a mixer; and in the case of samples 2–4, the coated aggregate was immediately mixed with the Portland cement and water at ambient temperatures.

The results of Table I show that while the expansion characteristics of asphaltic concrete due to temperature change are several times greater than those of Portland cement concrete, the aggregate may be coated with the bituminous material without materially increasing the amount of expansion or contraction of a Portland cement concrete due to temperature change.

The bituminous film on the aggregate does not substantially reduce the stability of the Portland cement concrete as shown in Table II.

TABLE II

| Sample No. | Composition | Stability Factor |
|---|---|---|
| 1 | A 60–40 mixture of coarse and fine aggregate, respectively, mixed with 6% bitumen and 0% Portland cement. | 36 |
| 2 | A 60–40 mixture of coarse and fine aggregate, respectively, in which only the coarse aggregate was coated with 3% bitumen and the entire mixture was mixed with 16.2% Portland cement. | 87 |
| 3 | A 60–40 mixture of coarse and fine aggregate, respectively, in which only the fine aggregate was coated with 3% bitumen and the entire mixture was mixed with 16.8% Portland cement. | 87 |
| 4 | A 60–40 mixture of coarse and fine aggregate, respectively, was coated with 3% bitumen and mixed with 15% Portland cement. | 80 |
| 5 | A 60–40 mixture of uncoated coarse and fine aggregate, respectively, was mixed with 18% Portland cement. | 88 |

The compositions of samples 1–5 are the same as samples 1–5, respectively, in Table I. After the samples were prepared, they were fabricated into specimen blocks 4 inches in diameter and 2.5 inches high. They were moist cured for 7 days, air cured for 2 days, brought to a temperature of 140° F., and then tested in a Hveem Stabilometer.

By providing a flexible film of bitumen on the aggregate, the paving composition has a lower modulus of elasticity and is thus less brittle and has more stretch than conventional Portland cement concretes. As with conventional Portland cement concretes, the amount of cement and water to be added to the paving composition will vary depending upon the type of concrete composition desired. However, since the bitumen itself is a binder, the amount of Portland cement employed can be less than that employed in conventional Portland cement paving compositions. Thus, the amount of total binder, bitumen and Portland cement, in the composition can be from about 4 percent to about 25 percent, depending upon characteristics and properties desired in the resulting composition.

I claim:

1. A paving composition consisting essentially of aggregate the particles of which are coated with a film of bituminous material selected from the class consisting of tar, asphalt, cut back asphalt, and fast breaking and medium breaking asphaltic emulsions present in an amount of from about 2 percent to about 8 percent based on the weight of the aggregate, Portland cement, and water in an amount sufficient to hydrate said cement, the total amount of said bituminous material and Portland cement in said composition being from about 4 percent to about 25 percent.

2. A paving composition as set forth in claim 1 in which said film contains a fibrous material present in an amount up to about 3 percent based on the weight of said bituminous material.

3. A paving composition as set forth in claim 1 in which said film contains a filler material present in an amount up to about 18 percent based on the weight of said bituminous material.

4. A paving composition as set forth in claim 1 in which said film contains a mixture of fibrous and filler materials present in an amount up to about 3 percent of said fibrous material and up to about 18 percent of said filler material based on the weight of said bituminous material.

5. A method of making a paving composition, consisting essentially of the steps of mixing aggregate with a bituminous material to form a film of said bituminous material over the aggregate particles, said bituminous material being selected from the class consisting of tar, asphalt, cut back asphalt, and fast breaking and medium breaking asphaltic emulsions, and mixing said aggregate after said coating step with Portland cement and water, said water being present in an amount sufficient to hydrate said cement, said bituminous material being present in an amount of from about 2 percent to about 8 percent based on the weight of the aggregate and the total amount of said bituminous material and Portland cement in the composition being from about 4 percent to about 25 percent.

6. The method as set forth in claim 5 with the addition that up to about 3 percent of a fibrous material is added with said bituminous material.

7. The method as set forth in claim 5 with the addition that up to about 18 percent of a filler material is added with said bituminous material.

8. The method as set forth in claim 5 with the addition that up to about 3 percent of a fibrous material and up to about 18 percent of a filler material is added with said bituminous material.

* * * * *